United States Patent
Roos et al.

(10) Patent No.: US 9,598,537 B2
(45) Date of Patent: Mar. 21, 2017

(54) METHOD FOR THE PURIFICATION OF POLY(ARYLENE ETHERS)

(71) Applicants: Martin Roos, Haltern am See (DE); Jürgen Herwig, Hünxe (DE); Kévin Micoine, Herten (DE); Frank Weinelt, Billerbeck (DE)

(72) Inventors: Martin Roos, Haltern am See (DE); Jürgen Herwig, Hünxe (DE); Kévin Micoine, Herten (DE); Frank Weinelt, Billerbeck (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/786,986

(22) PCT Filed: Apr. 22, 2014

(86) PCT No.: PCT/EP2014/058085
§ 371 (c)(1),
(2) Date: Oct. 25, 2015

(87) PCT Pub. No.: WO2014/177418
PCT Pub. Date: Nov. 6, 2014

(65) Prior Publication Data
US 2016/0075825 A1    Mar. 17, 2016

(30) Foreign Application Priority Data

Apr. 29, 2013  (EP) .................................... 13165807

(51) Int. Cl.
| | | |
|---|---|---|
| C08G 65/38 | (2006.01) | |
| C08G 65/46 | (2006.01) | |
| C08G 65/40 | (2006.01) | |
| C08G 65/44 | (2006.01) | |
| C08G 65/48 | (2006.01) | |
| B01D 61/02 | (2006.01) | |
| C08G 2/00 | (2006.01) | |

(52) U.S. Cl.
CPC ........... *C08G 65/46* (2013.01); *B01D 61/027* (2013.01); *C08G 65/40* (2013.01); *C08G 65/44* (2013.01); *C08G 65/485* (2013.01); *B01D 2311/04* (2013.01); *B01D 2311/12* (2013.01)

(58) Field of Classification Search
CPC ................................ C08G 65/46; C08G 65/40
USPC ......................................... 528/125, 171, 219
See application file for complete search history.

(56) References Cited

U.S. PATENT DOCUMENTS

| | | |
|---|---|---|
| 4,463,164 A | 7/1984 | Dalton et al. |
| 4,743,661 A | 5/1988 | Mitulla et al. |
| 4,946,939 A * | 8/1990 | Murphy ................. C08G 65/30 210/644 |
| 5,348,569 A | 9/1994 | Bikson et al. |
| 5,658,994 A | 8/1997 | Burgoyne, Jr. et al. |
| 5,874,516 A | 2/1999 | Burgoyne, Jr. et al. |
| 6,060,170 A | 5/2000 | Burgoyne, Jr. et al. |
| 6,159,370 A | 12/2000 | Hicke et al. |
| 6,716,955 B2 | 4/2004 | Burgoyne, Jr. |
| 2003/0171527 A1 | 9/2003 | Burgoyne, Jr. |
| 2004/0073069 A1 | 4/2004 | Heider et al. |
| 2005/0014921 A1 | 1/2005 | Burgoyne, Jr. et al. |
| 2005/0070685 A1 | 3/2005 | Mitsui et al. |
| 2005/0240002 A1 | 10/2005 | Burgoyne, Jr. et al. |
| 2007/0265415 A1* | 11/2007 | Richter ................. C08G 65/40 528/125 |
| 2012/0123079 A1 | 5/2012 | Ungerank et al. |
| 2012/0279922 A1 | 11/2012 | Haensel et al. |

FOREIGN PATENT DOCUMENTS

| | | |
|---|---|---|
| EP | 0 631 807 | 1/1995 |
| JP | 2010-24282 | 2/2010 |
| WO | WO 2010/142979 | 12/2012 |

OTHER PUBLICATIONS

English Translation of International Search Report for PCT/EP2014/058085 filed Apr. 22, 2014.
Written Opinion for PCT/EP2014/058085 filed Apr. 22, 2014, in German with partial machine translation attached.
Applicant Arguments and Claim Annex filed during Chapter II of PCT/EP2014/058085, filed Apr. 22, 2014 with machine translation of arguments and English translation of claim annex attached.
English translation of International Preliminary Report on patentability for PCT/EP2014/058085 filed Apr. 22, 2014, (as made available on WIPO website).

* cited by examiner

*Primary Examiner* — Terressa Boykin
(74) *Attorney, Agent, or Firm* — Law Office of: Michael A. Sanzo, LLC

(57) ABSTRACT

The invention relates to a method for the purification of poly(arylene ethers) of formula (I) in which m=0 to 1.0, n=1.0-m, and $Ar_1$, $Ar_2$, $Ar_3$ and $Ar_4$ independently represent divalent arylene groups. The compound of formula (I) is produced in a first step 1, with a raw product being obtained by bringing a metal or ammonium salt of divalent dihydroxy derivatives of $Ar_1$ or $Ar_3$ into contact with one or more dihalogenated derivatives of $Ar_2$ and/or $Ar_4$, in the presence of a solvent LM1. A precipitate that is present, if appropriate, is separated (step B) so as to obtain a solution L which then undergoes a membrane filtration (step C).

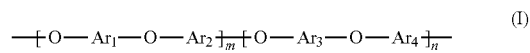

(I)

20 Claims, No Drawings

METHOD FOR THE PURIFICATION OF POLY(ARYLENE ETHERS)

CROSS REFERENCE TO RELATED APPLICATIONS

The present application is US national stage of international application PCT/EP2014/058085, which had an international filing date of Apr. 22, 2014, and which was published in German under PCT Article 21(2) on Nov. 6, 2014. Priority is claimed to European application EP 13165807.2, filed on Apr. 29, 2013.

The present invention relates to a method for the purification of poly(arylene ethers) and use thereof.

The electronics industry uses dielectric materials as insulating layers between various circuits and circuit layers in integrated circuits and related electronic components. As the electronics industry shifts to more compact circuits with finer circuit or linear geometry in more densely packed circuit patterns, the demands on the dielectric constant of the insulating layers for lower values are always increasing.

Therefore, there exists a need in the electronics industry to replace dielectric intermediate layer materials based on silicon dioxide by materials of lower dielectric value. Silicon dioxide and modified versions thereof have dielectric values of the order of 3.0 to 5.0 and usually 4.0 to 4.5. Polymeric materials which are used as a substitute for silicon dioxide for dielectric intermediate layer materials may have values for the dielectric constants in the range of 1.9 to 3.5, wherein these values are highly dependent on the structure of the polymeric materials. To successfully replace silicon dioxide as a dielectric intermediate layer material, the properties of the polymeric materials must comply with the strict manufacturing requirements for integrated circuits or microchips in the electronics industry.

Various polymers have already been proposed as dielectric materials for integrated circuits where such polymeric materials include polyimides and fluorinated poly(arylene ethers). The presence of fluorine in polymeric dielectric materials has been used to achieve different results. In polyimides, fluorine-containing substituents lowered the dielectric value, reduced the hydrophilicity, improved the optical transparency and controlled the solubility of polyimides in organic solvents. Fluorine in fluorinated poly (arylene ethers), which have been proposed as a substitute for materials of low dielectric value, improved the synthesis of the fluorinated poly(arylene ethers) by activating the corresponding sites in the polymer precursors and providing low dielectric values. In addition, polyimides have been altered with thermally unstable derivatives which decompose to gaseous by-products and result in a self-foaming dielectric polyimide material having lowered dielectric constants, in which the low dielectric constant of air, which is 1.00, is exploited.

Non-fluorinated poly(arylene ethers), which are suitable as a substitute for a dielectric material based on silicon dioxide, are known from EP-A-0755957. They have a low dielectric constant, high heat stability and low hydrophilicity at relatively high air humidity. They have the following structure:

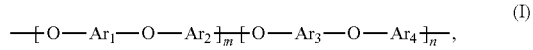
(I)

where $Ar_2$, $Ar_3$ and $Ar_4$ are individual divalent arylene residues and $Ar_1$ is a 9,9-bis(4-hydroxyphenyl)fluorene residue.

The poly(arylene ethers) are synthesized, for example, by the Ullmann condensation using copper-containing catalysts. Here, for example, an alkali metal salt of 9,9-bis(4-hydroxyphenyl)fluorene, optionally with an alkali metal salt of a divalent dihydroxy derivative of $Ar_3$ can be brought into contact with one or more dihalogenated derivatives of $Ar_2$ and/or $Ar_4$ at elevated temperature in the range of 100 to 300° C. in the presence of a copper catalyst and a solvent such as benzophenone and the resulting poly(arylene ether) product can be obtained as a crude product.

The reaction mixture is typically worked-up by cooling the reaction mixture to 100° C. for example and admixing with toluene. Subsequently, the mixture can be quenched in a rapidly stirred solution of acetic acid in methanol (e.g. 2.5%). In this case, a precipitate is formed which can be isolated. The precipitate can then be placed in boiling water for some hours. The precipitate can then be dried in an oven (100° C.) and be dissolved in tetrahydrofuran. The polymer solution is filtered and then precipitated in methanol. The precipitate is collected, washed with a solvent such as methanol and subsequently dried under vacuum.

Further poly(arylene ether) polymers and also the work-up with acetic acid-methanol solutions with precipitation of the crude product are described for example in EP-A-0939096, EP-A-1327652, EP-A-0758664, US 2005/014921 and US 2005/240002.

This proven purification method, however, is complex and cost-intensive. Moreover, chemicals such as toxic mixtures of acetic acid and methanol are used.

Accordingly, the object of the present invention was to provide a novel method for the purification of poly(arylene ethers) of formula (I), which is less cost-intensive and less complex. Furthermore, the method should be simple to carry out, be characterized by greater safety and low and less toxic waste.

The invention should provide a method for the purification (purification method) of poly(arylene ethers) of formula (I)

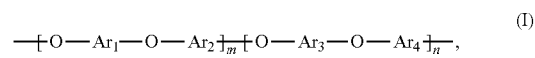
(I)

where m=0 to 1.0 and n=1.0-m and $Ar_1$, $Ar_2$, $Ar_3$ and $Ar_4$ are mutually independently divalent arylene residues. Here, the compounds of formula (I) can be prepared in a first step 1 to obtain a crude product by bringing a metal salt or ammonium salt of divalent dihydroxy derivatives of $Ar_1$ or $Ar_3$ into contact with one or more dihalogenated derivatives of $Ar_2$ and/or $Ar_4$, in the presence of a solvent LM1 (preparation method). The crude product is obtained in solution or in a suspension. The derivatives of $Ar_1$, $Ar_2$, $Ar_3$ and $Ar_4$ used for the reaction in this preparation method are referred to below as monomers.

The object has been achieved by a purification method according to claim 1 (inventive method). Accordingly, a method for the purification is provided which is characterized in that in a step B following step 1 a precipitate that may be present is removed so as to obtain a solution L and in a following step C the solution L is subjected to a membrane filtration.

The crucial difference in the purification method according to the present invention compared to the prior art can be seen in that the compound of formula (I) in the crude product (also called crude polymer) is not precipitated. Rather, the crude product remains in solution during the purification, which makes it easier to process and no losses through recrystallization or filtration arise. Thus, significantly fewer manual operations are necessary.

Compared to the precipitation methods of the prior art, membrane filtration further offers the advantage that less solvent overall needs to be used, the solvent is significantly easier to recycle and is thereby reusable.

Further embodiments of the invention arise from the dependent claims.

The polymer of formula (I) preferably comprises no halogen groups (with the exception of the terminal halogen groups in the dihalogenated derivatives of $Ar_2$ and/or $Ar_4$ optionally present) or other groups reactive to metals.

In the formula (I), m is preferably 0.5 to 1, preferably 0.8 to 1 and particularly preferably 1.

The poly(arylene ether) of formula (I) preferably has a number-average molecular weight of 10000 to 30000. The molecular weight is determined by means of gel permeation chromatography (GPC) against a styrene calibration standard. The sample is prepared with 5 g/L content in tetrahydrofuran at 23° C. Column: styrene-divinylbenzene copolymer; mobile phase: tetrahydrofuran; flow rate: 1 mL/min; detection: refractive index; internal standard: ethylbenzene.

The dihalogenated derivatives $Ar_2$ and $Ar_4$ may be halogenated with fluorine, chlorine, bromine or iodine, chlorine and bromine being preferred. Very particular preference is given to bromine. Particularly in the case of some difluorinated derivatives, the reaction for the formation of poly (arylene ethers) of formula (I) can proceed without catalyst. In this case, suitable preliminary experiments can be carried out by those skilled in the art.

The ammonium salts comprise both ammonium compounds $NH_4^+$ and quaternary ammonium compounds of the formula $NR_4^+$. The residue R can be the same or different, preferably the same and preferably comprises alkyl groups having 1 to 10 carbon atoms, preferably 1 to 4 carbon atoms. Particularly in the case of ammonium salts, the salts formed in step 1 may remain in solution so that the optional step B does not need to be carried out.

The metal salts of the divalent dihydroxy derivatives may be obtained in situ by mixing the relevant dihydroxy compounds with suitable metal hydroxides, anhydro bases or mixtures thereof. Counterions of the dihydroxy derivatives to be mentioned are, for example, alkali metals and alkaline earth metals, alkali metals being preferred. Particularly preferred alkali metals are potassium and sodium, potassium being especially preferred. Suitable anhydro bases are, for example, metal hydrides, alkoxides, metal carbonates and tertiary amines.

The water potentially formed in the formation of the metal salt should be removed prior to the polymerization. This can be done, for example, by means of azeotropic distillation.

The reaction of the monomers (polymerization) is preferably carried out at a temperature of 100 to 300° C. Preferably, a temperature in a range from 180 to 250° C. is selected. Higher temperatures can lead to the degradation or decomposition of the reactants, the polymer and the solvent used.

The preparation method can be conducted with or without catalyst. The reaction of the divalent dihydroxy derivatives of $Ar_1$ and $Ar_3$ with the dihalogenated derivatives of $Ar_2$ and/or $Ar_4$ is preferably carried out in the presence of a catalyst. Suitable homogeneous or heterogeneous catalysts for the reaction, preferably homogeneous catalysts, are known to those skilled in the art. The catalysts preferably comprise metals selected from copper, palladium or iron. Preference is given to copper-containing catalysts, particularly preferably copper (I).

During the polymerization, precipitates may be formed such as salts of the catalyst and of the cations which originate from the metal salts of the divalent dihydroxy derivatives, and the halides from the dihalogenated derivatives. The solubility is dependent on the solvent LM1 selected, such that a precipitate is not necessarily formed.

Investigations of the mechanism have shown that the Cu(I) cation is the active catalyst and not elemental copper (Cu(0)) or the Cu(II) cation, so that copper catalysts comprising Cu(I) are preferred. In principle, however, both elemental or divalent copper can be used which are converted to Cu(I) in situ. The in situ preparation is known to the person skilled in the art.

Palladium is typically used in the oxidation states Pd(0) or Pd(II). Iron can be used as Fe(II) or Fe(III).

The copper catalyst used in the reaction may be a copper salt such as copper halide, e.g. copper chloride, copper bromide or copper iodide. Copper halides, in particular copper bromide, are preferred since they are particularly effective, but other copper salts can also be used, e.g. copper acetate and copper formate. The copper catalyst may also be a complex of a copper salt above, which has been prepared by combination of the copper salt with a complexing agent such as pyridine, dimethylacetamide, quinoline, acridine, dimethylformamide and n-methylpyrrolidone. The amount of complexing agent can vary in a wide range.

The reaction between the dihalogenated derivatives and the metal salts of the divalent dihydroxy derivatives preferably proceeds on an equal molar basis. Variations in the distribution of the molecular weight are achieved by changing the ratio between the diol salt and the dihalide.

Suitable LM1 solvents include benzophenone, diphenyl ether, benzonitrile, dialkoxybenzenes in which the alkoxy group comprises 1 to 4 carbon atoms, trialkoxybenzenes in which the alkoxy group comprises 1 to 4 carbon atoms, diphenyl sulfone, dimethyl sulfoxide, dimethyl sulfone, diethyl sulfoxide, diethyl sulfone, diisopropyl sulfone, tetrahydrothiophene, 1,1-dioxide(tetramethylene sulfone or sulfolane) and tetrahydrothiophene-1-monoxide. Particularly preferred LM1 solvents are diphenyl ether, benzophenone or mixtures thereof, wherein mixtures are especially preferred.

In a preferred embodiment of the invention, prior to the removal of a precipitate that may be present (step B), an aprotic polar solvent LM2 is added to the crude product (step A). A preferred solvent LM2 is selected from an aliphatic or aromatic, cyclic or a cyclic ether, ketone, ester or a mixture thereof, where cyclohexanone, tetrahydrofuran, gamma-butyrolactone or a mixture of the solvents are particularly preferred and tetrahydrofuran is especially preferred.

The addition of the solvent LM2 leads to a reduction in viscosity, which is helpful for the membrane filtration. The precipitates already mentioned may also occur, which can be removed in step B. The precipitates are formed by reactants or by-products which may occur already during step 1.

It is advantageous to add an acid to the solution or suspension (mixture M) in step A or before step B. As a result of this, the terminal phenoxide groups of the poly (arylene ether) are protonated. The acid may be added separately or as a mixture before, after or with the solvent LM2. The acids are preferably selected from carboxylic acids, acetic acid being particularly preferred. By addition of the acid, the proportion of potassium compounds in the processed poly(arylene ether) is further reduced.

The quantitative amount of acid added is guided by the amount of phenoxide end groups. The quantitative amount of protons released from the acids preferably corresponds to at least 80% of the quantitative amount of phenoxide end groups. The determination of the quantitative amount of phenoxide end groups is familiar to those skilled in the art and may be determined via the molar mass for example.

The precipitate according to step B can be removed by means of filtration or centrifugation, wherein both possibilities may be combined with each other. The filter which may be used for the removal of the precipitate that may be present in step B preferably has a number-average pore size of 0.1 to 50 μm, preferably 0.3 to 30 μm and particularly preferably 0.5 to 20 μm. The person skilled in the art can determine the suitable pore size with a few preliminary experiments. The membrane filtration and the further processing should be carried out particularly with an optically clear solution.

The membrane filtration in step C may be a nanofiltration or an ultrafiltration, nanofiltration being preferred. By means of ultrafiltration, particles having a size of ca. 5 to 100 nm can be removed. The molecular weight cut-off is in a range of about 1000 to 200 000 g/mol. By means of the nanofiltration, particles having a size of ca. 1 to 10 nm (cut-off ca. 100 to 10000 g/mol) can be removed.

The filter preferably has a membrane which is produced having a separating layer of polymer, glass, metal, ceramic, or mixtures thereof.

Preference is given to solvent-stable polymer membranes such as are described, for example, in US 2012/0123079, WO 2010/142979, US 2012/0279922 or EP 0943645B1, or ceramic membranes, which are offered, for example by Inopor GmbH, PALL Corporation or TAMI Industries. Due to the relatively high ratio of the active membrane surface to the unit volumes, membranes in the form of spirally wound modules are particularly preferred.

The solvent LM1, the catalyst and low molecular weight oligomers of the poly(arylene ether) potentially formed may be removed by the membrane filtration. The nanofiltration is preferably carried out such that the proportion of metal ions is 0 to 100 ppm, preferably 0 to 30 ppm, based on the solid product obtained. It is further preferred that the proportion by weight of LM1 at the end of the membrane filtration is less than 1%, based on the total weight of the solution. Such results can be set by those skilled in the art by varying the duration of the membrane filtration and the membrane separating layer.

Suitable membrane separating layers are described, for example, in WO 2010/142979, US 2012/0279922 or EP 0943645B1. Suitable polymers are polyacrylonitriles (PAN), polyimides (PI), polyether ether ketones (PEEK), polyvinylidene fluorides (PVDF), polyamides (PA), polyamidimides (PAD), polyether sulfones (PES), polybenzimidazoles (PBI), sulfonated polyether ketones (SPEEK), polyethylenes (PE) and polypropylenes (PP).

Suitable ceramic membranes include porous inorganic materials, ceramic membranes or polymeric ceramic membranes composed of aluminum oxide, titanium dioxide, zirconium dioxide, silicon dioxide, titanium nitrite or mixtures and modifications thereof.

The poly(arylene ether) which, after the membrane filtration (step C), is obtained in solution comprising the optional solvent LM2, is preferably obtained in a subsequent step D as a solid. The recovery of the solid can be effected by means of precipitation or removal of the solvent.

To precipitate the poly(arylene ether), the polymer solution from step C is added to a solvent which is miscible with LM2 and in which the poly(arylene ether) is insoluble. Suitable solvents are, for example, alcohols, particularly alkanols having 1 to 6 carbon atoms, ketones or water, preferably ethanol or acetone.

The removal of the solvent is familiar to those skilled in the art and can be accelerated by pressure reduction, temperature increase or the like.

The resulting poly(arylene ether) may be obtained as a powder or granules, e.g. by means of devolatilization by extrusion.

The purification method according to the invention therefore comprises the preparation of a crude product according to the prior art (step 1) and the subsequent steps B (removal of a precipitate that may be present) and C (membrane filtration). Optionally, a step A may be carried out after step 1 and before step B in which an aprotic polar solvent LM2 is added to the crude product. The compound of the formula (I) is obtained as a solid in a step D following step C.

$Ar_1$, $Ar_2$, $Ar_3$ and $Ar_4$ are preferably mutually independently selected from:

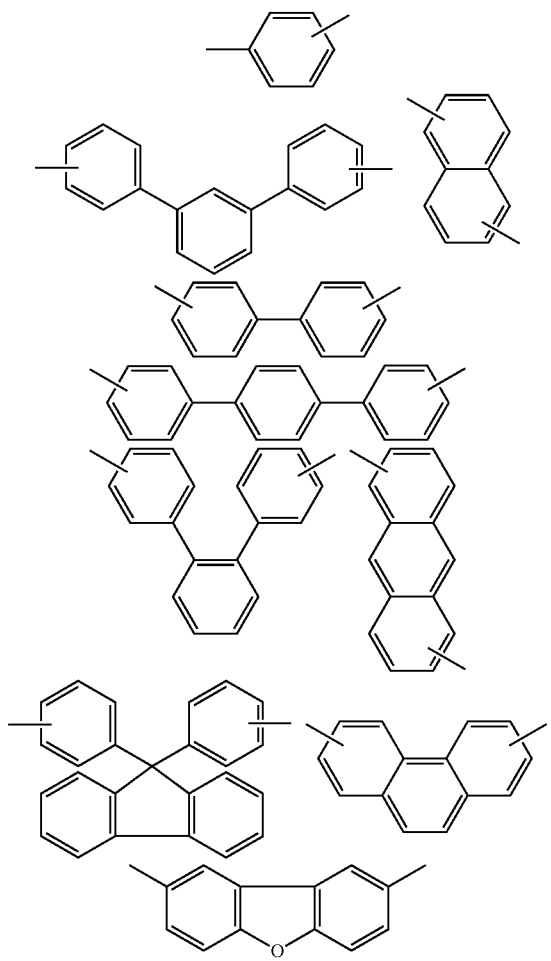

Variations in the monomers enable access to many different properties such as the reduction or elimination of crystallinity, modulus and tensile strength. These polymers have a low polarity, comprise no other functional or reactive groups which might adversely affect their use in dielectric insulation, and are heat-stable in an inert atmosphere up to temperatures of 400 to 450° C.

The poly(arylene ethers) may also be crosslinked, specifically either by itself by exposure to temperatures of more than 350° C. or by using a crosslinker and providing the polymer with known protecting groups at the termini such as phenylethynyl, benzocyclobutene, ethynyl and nitrile.

The polymers may be homopolymers, which are composed essentially of a single recurring unit. They may also be copolymers comprising a recurring unit of the above structure in combination with other recurring units of polyols and phenylene known from the prior art. A copolymer may be of the alternating, statistical or block type.

In a preferred embodiment, m=1 in formula (I) and $Ar_1$ corresponds to formula (V)

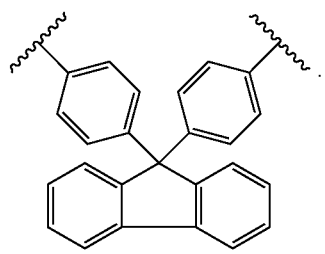
(V)

This results in a poly(arylene ether) of formula (II).

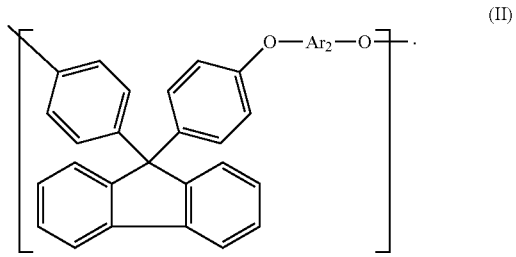
(II)

In a further preferred embodiment, m=1 in formula (I) and $Ar_2$ corresponds to formula (VI)

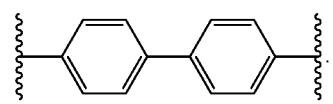
(VI)

This results in a poly(arylene ether) of formula (III).

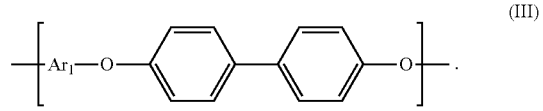
(III)

In a particularly preferred embodiment, m=1, $Ar_1$ corresponds to formula (V) and $Ar_2$ corresponds to formula (VI), such that the poly(arylene ether) has a structure of the formula (IV):

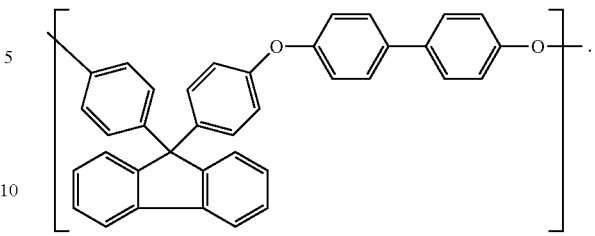
(IV)

In an especially preferred embodiment of the invention, the preparation method is carried out using 4,4'-dibromobiphenyl and 9,9-bis(4-hydroxyphenyl)fluorene (bisphenol FL) to obtain a poly(arylene ether) of the formula (IV). The reaction is carried out in a mixture of benzophenone and diphenyl ether (LM1), wherein copper bromide is used as catalyst. Potassium functions as counterion of the bisphenol FL. During the reaction, potassium bromide may already precipitate. The work-up is effected by addition of tetrahydrofuran as LM2 (step A) and acetic acid, whereupon copper bromide and further potassium bromide precipitate out; these salts are removed (step B). An optically clear solution is obtained. Subsequently, the membrane filtration is carried out, so that low molecular weight oligomers of the poly(arylene ether), diphenyl ether, benzophenone and residues of copper catalyst are removed. An optically clear solution is obtained comprising poly(arylene ether) and tetrahydrofuran.

The present invention further relates to the use of the poly(arylene ether) which is obtained by the method according to the invention in injection molding parts, semi-finished products (stock shapes), fibers, foils, coatings, electronic circuit components and films and also as a material for seals such as sealing rings. The poly(arylene ethers) may be used to prepare the items mentioned above.

The coatings, for example, may be used for wire coatings.

Furthermore, the insulating property of the poly(arylene ether) may be exploited by replacing the existing insulators in electrical and electronic systems. In this respect, it may be used as an insulator.

The fields of application of the poly(arylene ether) are, for example, in areas of oil field applications, in aviation and aerospace, in defense, rotating equipment, the automotive industry, medicine and pharmacy, in the chemical industry and mechanical engineering.

The poly(arylene ethers) obtained by the method according to the invention may be used in a multi-chip module in which a substrate typically produced from silicon, glass or ceramic bears high-density, multi-layer switching connections in which the dielectric material, which provides insulation between the various layers, is the polymer according to the invention. Semi-conductor chips are mounted on the switching connections which are linked to one another by electrical conductors in the switching connection. The substrate may also comprise electrical conductors, e.g. for current and grounding. Lead frames establish connections with external circuits. In such multi-layer switching connections, the layers of the electrical connections are separated from one another by the polymers according to the invention. The polymers according to the invention may also separate different conducting regions from one another, for example, various discrete conductors in a common layer. A passage line can create the connections between the various layers as needed. The passage line is connected with an integrated circuit by a bonded pad. This passage line may be similar to the structure of stacked columns, although other forms customary in the art such as stepped or interdigitated passage lines can be used. Other multi-chip module forms in which the polymers according to the invention may be used are known in the art.

The poly(arylene ethers) obtained by the method according to the invention can be used as a dielectric intermediate layer in a switching connection for a chip with a single integrated circuit. A chip having an integrated circuit would have several layers of the dielectric poly(arylene ether) substance and several layers of metal conductors on its surface. It may also include regions of the dielectric poly(arylene ether) substance between discrete metal conductors or conductor regions in the same layer or in the same level of an integrated circuit. The poly(arylene ether) polymer can also be used along with conventional silicon, where the polymer is used between the metal lines on a layer and silicon serves as a dielectric material between layers of conductor material.

The poly(arylene ethers) obtained by the method according to the invention may also be used as protective coatings for integrated circuit chips to protect against alpha particles. Semiconductor components are prone to failure when alpha particles from radioactive trace contaminants in the packaging or other materials nearby strike the active surface. An integrated circuit can be provided with a protective coating of the poly(arylene ether). Typically, a chip for an integrated circuit would be attached to a substrate and secured with a suitable adhesive. A coating with the poly(arylene ether) provides the active surface of the chip with a protective layer against alpha particles. Optionally, encapsulation, e.g. of epoxide or a silicone, offers additional protection.

The poly(arylene ethers) may also be used as substrate (dielectric material) in circuit boards or printed circuit diagrams. On the surface of the circuit board made of the poly(arylene ether), patterns for the circuits of various electrical conductors are located. The circuit board may comprise, in addition to the inventive poly(arylene ether), various amplifiers, e.g. non-conducting woven fibers such as glass cloth. Such circuit boards may be single-sided, double-sided or multi-layered.

Films or coatings composed of the inventive poly(arylene ether) may be produced by solution techniques such as spraying, spin coating or casting. Preferred solvents are tetrahydrofuran, 2-ethoxyethyl ether, cyclohexanone, cyclopentanone, toluene, xylene, chlorobenzene, N-methylpyrrolidone, N,N-dimethylformamide, N,N-dimethylacetamide, methyl isobutyl ketone, 2-methoxyethyl ether, 5-methyl-2-hexanone, gamma-butyrolactone and mixtures thereof, tetrahydrofuran being particularly preferred. Typically, the coating thickness is between 0.1 and 15 μm. As dielectric intermediate layer, the film thickness is less than 2 μm.

Additives may be used in a manner known in the art to provide the product with certain target properties or to improve this objective, including stabilizers, flame retardants, pigments, plasticizers and surfactants. Compatible or incompatible polymers may be blended in order to impart a desired property to the product.

Agents for improving adhesion may likewise be used in order to apply the poly(arylene ether) polymers adhering to the corresponding substrates. Typical of such agents are hexamethyldisilazane, which may be used to interact with the available hydroxyl functionality on the surface, for example, silicon dioxide which has been exposed to moisture generating such hydroxyl functionalities.

Polymers for microelectronic applications preferably comprise a low amount (generally less than 1 ppm, preferably less than 10 ppb) of ionic impurities, especially for dielectric intermediate layers.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Polymerization (Non-Inventive)

3.8 kg of bisphenol FL and 3.3 kg of 4,4-dibromobiphenyl were dissolved in 2.5 kg of diphenyl ether, 10.5 kg of benzophenone and 5 kg of xylene in a 30 L reactor at 100° C. and the mixture stirred. The mixture was heated and a 45% by weight aqueous KOH solution (2.7 kg) was added slowly over 2 h. Water was removed from the mixture by means of azeotropic distillation. The xylene was distilled off. A mixture of copper bromide (23 g) and acridine (19 g) was then added. The reaction mixture was heated to 200° C. and stirred for several hours up to the point of the desired degree of polymer architecture.

A quarter of the reaction mixture obtained (crude product) was then purified in the next step.

Purification (Inventive)

The crude polymer solution from the polymer reactor comprised ca. 1.3 kg of polymer, 2.6 kg of benzophenone, 0.62 kg of diphenyl ether, 0.62 kg of potassium bromide and the catalyst. 23 mL of acetic acid was added and the solution was diluted to a volume of ca. 30 L with tetrahydrofuran.

The insoluble potassium bromide and copper bromide salts were removed from the polymer solution by means of a pressure filtration. This filtration was effected using a Seitz KS80 depth filter (pore size 0.6-1.6 μm) in a pressure suction filter.

The clear filtered polymer solution was then purified using solvent-stable nanofiltration (OSN). A DuraMem® 900 membrane module (cut-off: 900 g/mol) from Evonik was used having a surface area of 1.8 m². The polymer solution was firstly concentrated by means of the membrane up to a polymer concentration of ca. 10% by weight. The solution was then washed with 120 L of THF at a pressure of 20 bar and a temperature of ca. 30° C. The high-boiling solvents (diphenyl ether and benzophenone), relatively small oligomers and soluble catalyst residues went through the membrane into the permeate and a highly pure polymer solution in THF was obtained in the retentate.

GC analysis of this polymer solution showed a fraction of benzophenone and diphenyl ether below 0.1% and the number-average molar mass of the polymer (Mn) increased due to the removal of oligomers from 16000 to 22000. In addition, elemental analysis demonstrated the removal of inorganic salts and catalysts.

Fractions in the Purified, Isolated Polymer:
Copper<20 ppm.
Potassium<10 ppm

The invention claimed is:
1. A method for the purification of poly(arylene ethers) of formula (I):

$$-\!\!\!-\!\!\!\left[\!O\!-\!Ar_1\!-\!O\!-\!Ar_2\right]_{\overline{m}}\!\!\left[\!O\!-\!Ar_3\!-\!O\!-\!Ar_4\right]_{\overline{n}}, \qquad (I)$$

where m=0 to 1.0 and n=1.0-m and $Ar_1$, $Ar_2$, $Ar_3$ and $Ar_4$ are mutually independently divalent arylene residues, wherein said method comprises:

A) preparing a crude product of the compound of formula (I) in a first step by bringing a metal salt or ammonium salt of divalent dihydroxy derivatives of $Ar_1$ or $Ar_3$ into contact with one or more dihalogenated derivatives of $Ar_2$ and/or $Ar_4$, in the presence of a solvent LM1 to form a solution L or a suspension comprising a precipitate;

B) if a suspension comprising precipitate is formed in step A, removing precipitate to obtain solution L; and C) filtering solution L by membrane filtration.

2. The method of claim 1, wherein said crude product is prepared in the presence of a catalyst other than said metal or ammonium salt.

3. The method of claim 2, wherein said catalyst comprises a metal selected from the group consisting of: copper, palladium and iron.

4. The method of claim 1, wherein an aprotic polar solvent LM2 is added to the solution or suspension formed in step A.

5. The method of claim 4, wherein the solvent LM1 in step A is selected from an aliphatic or aromatic, cyclic or acyclic, ether, ketone, ester or a mixture thereof.

6. The method of claim 4, wherein the solvent LM1 in step A is selected from cyclohexanone, tetrahydrofuran, gamma-butyrolactone or a mixture thereof.

7. The method of claim 6, wherein said solvent is, or comprises, tetrahydrofuran.

8. The method of claim 4, wherein an acid is added to the solution or suspension formed in step A.

9. The method of claim 1, wherein, in step B, precipitate is removed by filtration or centrifugation.

10. The method of claim 1, wherein said membrane filtration is a nanofiltration.

11. The method of claim 1, wherein the membranes of said membrane filters have a separating layer selected from polymers, glass, metal, ceramic or mixtures thereof.

12. The method of claim 1, further comprising:

D) obtaining a solid polymer from a filtered solution produced in step C.

13. The method of claim 1, wherein, in formula (I), m=1 and $Ar_1$ is a compound of formula (V):

14. The method of claim 1, wherein in formula (I), m=1 and $Ar_2$ is a compound of formula (VI):

15. The method of claim 1, wherein in formula (I), m=1 and the poly(arylene ether) is a polymer of the formula (IV):

16. The method of claim 15, wherein said crude product is prepared in the presence of a catalyst selected from the group consisting of: copper, palladium and iron.

17. The method of claim 16, wherein an aprotic polar solvent LM2 is added to the solution or suspension formed in step A.

18. The method of claim 17, wherein the solvent in step A is selected from an aliphatic or aromatic, cyclic or acyclic, ether, ketone, ester or a mixture thereof.

19. The method of claim 18, wherein the solvent in step A is selected from cyclohexanone, tetrahydrofuran, gamma-butyrolactone or a mixture thereof.

20. The method of claim 19, further comprising:

D) obtaining a solid polymer from a filtered solution produced in step C.

* * * * *